(12) United States Patent
Funakura (10) Patent No.: US 7,451,084 B2
(45) Date of Patent: Nov. 11, 2008

(54) CELL PHONE HAVING AN INFORMATION-CONVERTING FUNCTION

(75) Inventor: Hiroyuki Funakura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 771 days.

(21) Appl. No.: 10/899,066

(22) Filed: Jul. 27, 2004

(65) Prior Publication Data
US 2005/0027525 A1 Feb. 3, 2005

(30) Foreign Application Priority Data
Jul. 29, 2003 (JP) ............................. 2003-203212

(51) Int. Cl.
*G10L 15/26* (2006.01)
*H04B 1/38* (2006.01)
(52) U.S. Cl. ...................... 704/235; 455/563
(58) Field of Classification Search ................ None
See application file for complete search history.

(56) References Cited

U.S. PATENT DOCUMENTS

| | | | |
|---|---|---|---|
| 6,175,820 B1 * | 1/2001 | Dietz ........................ 704/235 |
| 6,477,491 B1 * | 11/2002 | Chandler et al. ............ 704/235 |
| 6,785,649 B1 * | 8/2004 | Hoory et al. ................ 704/235 |
| 7,072,684 B2 * | 7/2006 | Gusler et al. ............. 455/550.1 |
| 7,107,081 B1 * | 9/2006 | Fujisaki ................... 455/575.1 |
| 2003/0097262 A1 * | 5/2003 | Nelson ...................... 704/235 |
| 2003/0187641 A1 * | 10/2003 | Moore et al. ................ 704/235 |
| 2004/0082839 A1 * | 4/2004 | Haugen ..................... 600/300 |

FOREIGN PATENT DOCUMENTS

JP 2002-116871 A 4/2002
JP 2002-218092 A 8/2002

* cited by examiner

*Primary Examiner*—David R. Hudspeth
*Assistant Examiner*—Matthew J. Sked
(74) *Attorney, Agent, or Firm*—Sughrue Mion, PLLC (57) ABSTRACT

A voice discriminating tag for making a reception voice and a transmission voice distinguishable is added to the voice inputted into a cell phone. Further, a volume discriminating tag is added based on a detection result of a volume detector. A CPU converts the voice into character data and image data on the basis of the voice discriminating tag and the volume discriminating tag, referring to various files stored in file devices. The converted data is outputted to a display panel on which the character data corresponding to the transmission voice and the character data corresponding to the reception voice are shown in time series so as to have different colors. The character data is shown in a literal type corresponding to a volume level.

17 Claims, 5 Drawing Sheets

CELL PHONE HAVING AN INFORMATION-CONVERTING FUNCTION

BACKGROUND OF THE INVENTION

1. Field of the Invention

The present invention relates to a cell phone having a function for converting voice information into character information.

2. Description of the Related Art

Some of cell phones comprise a function for converting inputted voice information into character information. With respect to methods for converting the voice information into the character information, various methods are conceived. For example, Japanese Patent Laid-Open Publication No. 2002-116871 describes a system in that voice information inputted into a portable device is sent to a server by means of communication, and then, the voice information is converted into character information by a voice-recognition device included in the server. The converted character information is sent to the portable device and is shown on a display.

In the above-mentioned system, however, it is necessary to send the voice information from the portable device to the server. Further, it is also necessary to return the character information, which has been converted by the voice-recognition device, from the server to the portable device. Thus, there arises a problem in that it takes a time to obtain the character information. Moreover, there arises another problem in that quality of the voice information remarkably deteriorates and a voice-recognition rate of the voice-recognition device lowers because the voice information is transferred between the portable device and the server through a public network.

A technology such as described in Japanese Patent Laid-Open Publication No. 2002-218092 is proposed for solving the above problems. In this kind of the technology, a portable device is provided with a voice-recognition device by which the voice information is converted into the character information. In virtue of this, the voice-recognition rate may be prevented from lowering and the character information may be quickly confirmed.

However, in all of the above cell phones, either of reception voice and transmission voice is merely converted into the character information. It is impossible to simultaneously convert the reception voice and the transmission voice into the character information.

Further, it is impossible to express nuance of spoken language, emotional ups and downs thereof, etc. by the character information. In other words, although a voice can freely express emotion and language to be emphasized by changing voice volume of a talker, the above cell phones display the character information in a single font regardless of stresses of the voice volume when the voice including the stresses is converted into the character information. Thus, there arises a problem in that it is impossible to sufficiently express the emotion and the language to be emphasized, because an expression mode of the character information is poor in comparison with the voice. This kind of the problem is similarly caused in a case the character information is inputted with keys or by hand.

SUMMARY OF THE INVENTION

In view of the foregoing, it is a primary object of the present invention to provide a cell phone in which character information converted by means of voice recognition has improved expressiveness.

In order to achieve the above and other objects, the cell phone according to the present invention comprises a voice discriminator, a volume discriminator and a memory. The voice discriminator carries out voice recognition relative to transmission voice information and reception voice information to convert it into character data for representing character information. The transmission voice information is inputted via a microphone, and the reception voice information is outputted via a speaker. Also, the voice discriminator adds a voice discriminating tag to the character data in order to distinguish either of the transmission voice information and the reception voice information. The volume discriminator adds a volume discriminating tag, which represents a volume level of the voice information, to the character data. The memory stores the character data, in time series, to which the voice discriminating tag and the volume discriminating tag are added.

In a preferred embodiment, a display type of the character information is changed in accordance with the volume and voice discriminating tags. The character information is shown on a display in the different display type. In this case, at least one of a font, a character size and a character thickness of the character information is changed in accordance with the volume discriminating tag. A display color of the character information is changed in accordance with the voice discriminating tag. Further, a specific word is converted into image data corresponding to the character data converted by the voice discriminator. An image represented by the image data is shown on the display.

The cell phone of the present invention may further comprise an emotion determiner, which determines an emotional state of a talker at the time of phone call from the transmission voice information and the reception voice information. The emotion determiner adds emotion discriminating information to the character data. The emotion determiner may also determine an emotional state of a character-inputting person from an inputting manner of handwritten characters inputted via a touch panel. It is preferable to change at least one of a display font, a character size and a character thickness of the character information in accordance with the emotion discriminating information. Further, a letter or an indicia defined every emotion discriminating information may be added to the character information.

Further, an e-mail producing unit may be included to produce e-mail by using the character data, and an e-mail sending/receiving unit may be included to send and receive the produced e-mail.

According to the cell phone of the present invention, it is possible to produce a record to which distinction of the voice is added. The character information is variedly expressed so that it is possible to produce a record, which enhances the distinction of the voice and has improved expression. Since the display shows the image represented by the image data, visual expression becomes affluent. Moreover, since the display manner of the character is changed in accordance with the emotion of the talker, it is possible to improve the expression of the character information obtained by the voice recognition. Furthermore, it is possible to produce the e-mail merely by the voice so that the e-mail may be easily produced without a troublesome key operation.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
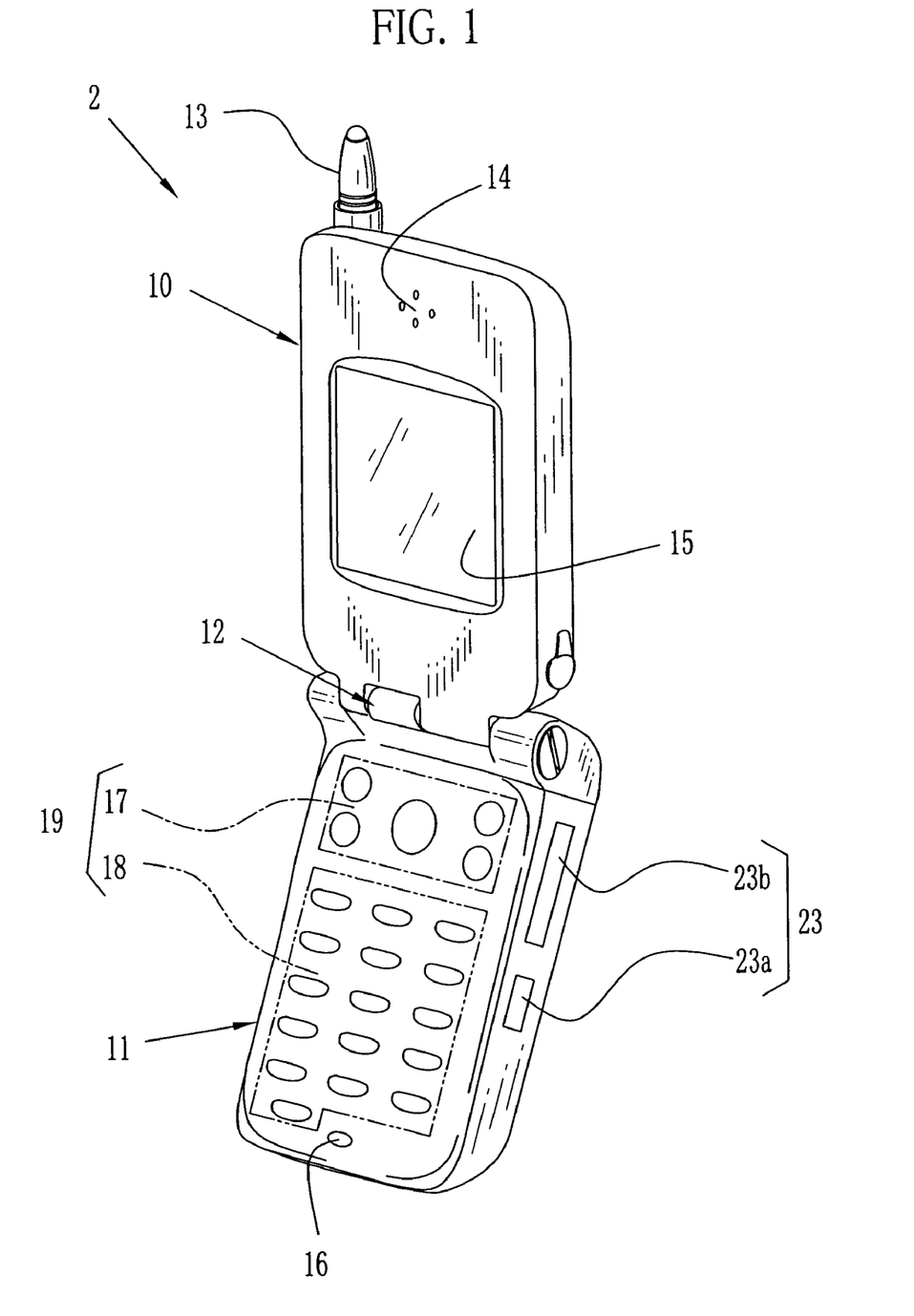
FIG. 1 is a perspective view showing a structure of a cell phone according to the present invention.

In FIG. 1, a cell phone 2 is constituted of an upper body 10 and a lower body 11, which are rotatably engaged with each other via a hinge 12. A rear side of the upper body 10 is provided with an antenna 13, and a front side thereof is provided with a speaker 14 and a display panel 15. As the display panel 15, a liquid-crystal panel (LCD) is used, for example. The lower body 11 is provided with a microphone 16 and an operating portion 19 including a selection key 17 (a portion surrounded by a chain line) and a dial key 18 (a portion surrounded by a two-dot chain line).

The hinge 12 is provided with a click mechanism (not shown) to retain the upper body 10 and the lower body 11 at a predetermined angle such as shown in the drawing when the cell phone 2 is used. The cell phone 2 is folded so as to confront the display panel 15 with the operating section 19 when not used.

The speaker 14 outputs a voice of a calling party (a reception voice) and a ringing melody. The microphone 16 converts a voice of a talker (a transmission voice) into electric voice information. The selection key 17 is operated when selecting and setting various menus for registering a telephone number and a mail address, for instance, and when utilizing Internet-access service and e-mail service. Moreover, by operating the selection key 17, modes of a phone-call mode and a voice-recognition mode are switched. In the phone-call mode, normal calling is performed through the voice. In the voice-recognition mode, the inputted voice is converted into character data and image data. Meanwhile, when inputting a telephone number and a sentence of e-mail, the dial key 18 is operated.

Figure 2:
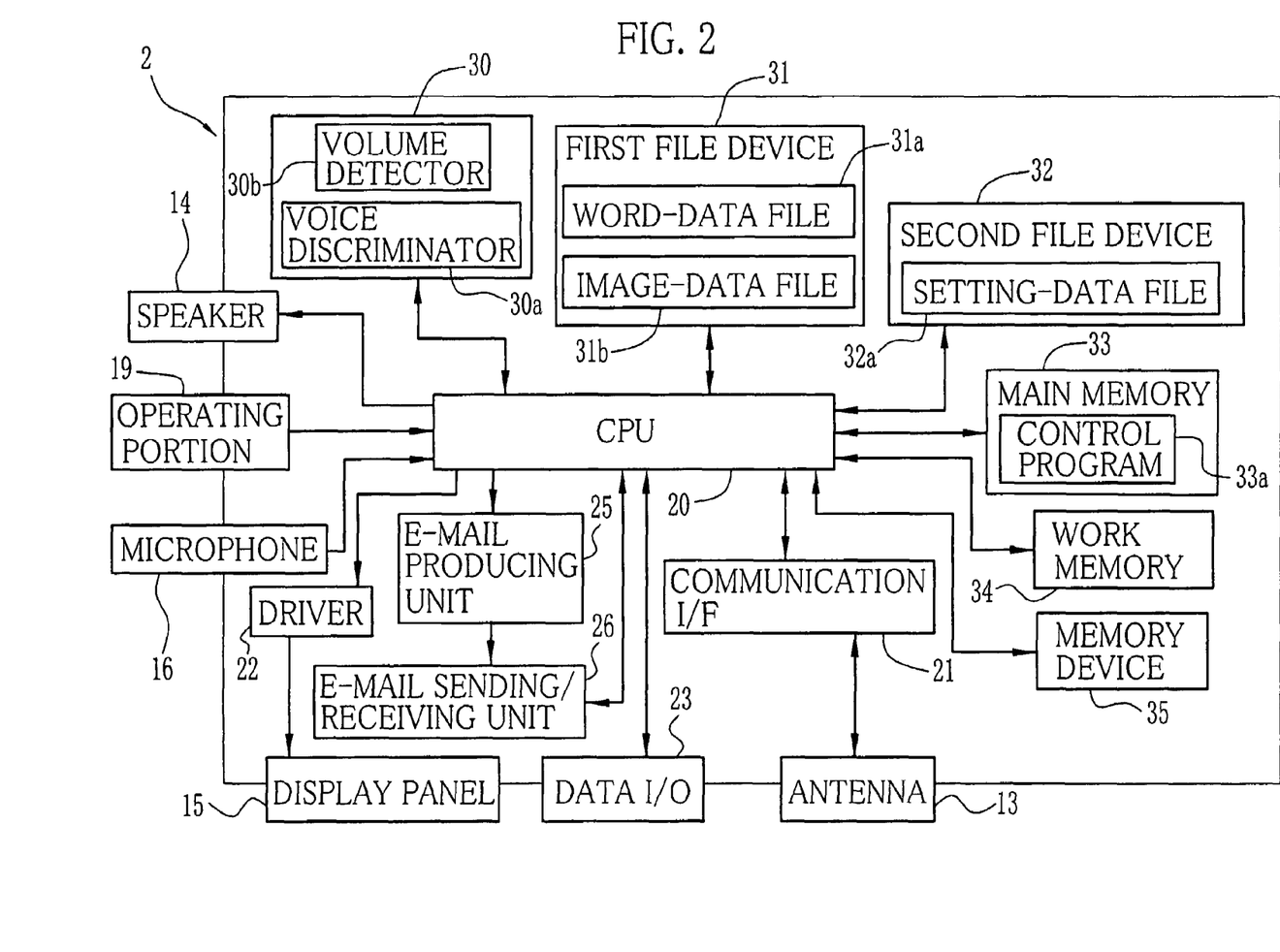
FIG. 2 is a block diagram showing an electrical structure of the cell phone.

The antenna 13 is drawn out of the upper body 10 at the time of making a phone call and utilizing the e-mail service and the Internet service. The antenna 13 receives radio-wave signals from the other cell phone, an Internet server and so forth, and sends radio-wave signals from the cell phone 2 to the outside. The antenna 13 converts the received radio-wave signals into electric signals and transfers the signals to a CPU 20 via a communication I/F 21, such as shown in FIG. 2. The CPU 20 controls an operation of each section of the cell phone 2. For example, the CPU 20 processes the signals transferred from the antenna 13 to output a voice and an image to the speaker 14 and the display panel 15.

A data I/O 23 comprises a cable connection port 23a and a loading gate 23b for various memory cards (see FIG. 1). The connection port 23a is used for connecting with an external memory device and so forth. The memory cards are an IC card, a smart medium, a memory stick and so forth. The data I/O 23 reads character data and image data from the above-noted storage media. Meanwhile, the character data and the image data of the cell phone 2 are outputted to an external device via the data I/O 23.

A menu picture including various setting menus is displayed on the display panel 15 via a driver 22. Moreover, the display panel 15 displays a telephone number of a calling party, a mail address, an image downloaded from the Internet server, and so forth via the driver 22.

A voice-recognition device 30 is constituted of a voice discriminator 30a and a volume detector 30b. In the voice discriminator 30a, voice recognition is executed relative to transmission voice information inputted from the microphone 16, and reception voice information inputted via the antenna 13 to produce feature-quantity data representing features of the voice information. Further, the voice discriminator 30a produces a voice discriminating tag in accordance with the input of the voice information to distinguish either of the transmission voice and the reception voice. In the volume detector 30b, a volume level is detected from amplitude information of the transmission voice information and the reception voice information to produce a volume discriminating tag. The voice and volume discriminating tags are added to the feature-quantity data.

A first file device 31 comprises a word-data file 31a and an image-data file 31b. The word-data file 31a includes the character data corresponding to the feature-quantity data. The image-data file 31b includes the image data corresponding to the character data. Incidentally, the image data is properly used so as to correspond to a specific word. For example, the image data is downloaded from the Internet server and is read out of the other storage medium via the data I/O 23. Alternatively, a user may produce own image data by operating the keys of the operating portion 19.

A second file device 32 stores a setting-data file 32a including setting data corresponding to the volume discriminating tag. The user selects in advance a type number of letters to be changed in accordance with the volume level of the voice (hereinafter, called as "literal type number"). Further, the user also selects in advance a concrete style of each literal type (hereinafter, simply called as "literal type"). The setting data is stored in the second file device 32 as the setting-data file 32a.

The literal type is defined by combining designation information concerning a font, a literal size, boldface/lightface, an italic, an under line, a frame line, hatching and so forth. For example, the volume level is classified into three steps, wherein the first step is the greatest volume level, the second step is the secondary volume level to the first step, and the third step is the smallest volume level. When the literal type is changed in accordance with the respective steps, the literal type number is three. For example, with respect to the literal type corresponding to the first step, it is considered that the combination is designated such that the font is Ming-cho type, the literal size is 20 points, and the literal thickness is boldface. As to the second step, the combination is designated such that the font is Ming-cho type, the literal size is 12 points, and the literal thickness is lightface. As to the third step, the combination is designated such that the font is Ming-cho type, the literal size is 9 points, and the literal thickness is lightface. It is needless to say that the literal type number is not exclusive to three in the present invention. The literal type number may be two and may be four or more. Further, the other font of Gothic, brush, round style and so forth may be used.

In accordance with the transmission and reception voices recognized by the voice-recognition device 30, the CPU 20 executes proper processing along a control program 33a stored in a main memory 33. The CPU 20 searches the word-data file 31a of the first file device 31 on the basis of the feature-quantity data transferred from the voice-recognition device 30. Successively, the CPU 20 extracts the corresponding character data. To the extracted character data, the voice discriminating tag and the volume discriminating tag are added so as to correspond to the voice. Moreover, the CPU 20 searches the image-data file 31b of the first file device 31 on the basis of the extracted character data. When there is the corresponding image data, the CPU 20 reads this data.

Further, the CPU 20 searches the setting-data file 32a of the second file device 32 on the basis of the volume discriminating tag added to the extracted character data. Successively, the CPU 20 converts the character data into predetermined literal-type data. Furthermore, the CPU 20 executes data processing on the basis of the voice discriminating tag added to the extracted character data. When showing the letters on the display panel 15, difference between the kinds of the voices (talkers) is adapted to be distinguishable. For instance, referring to the voice discriminating tag, different color codes are added to the character data of two sorts respectively corresponding to the reception voice and the transmission voice.

The character data for which data processing has been properly carried out is transferred to a work memory 34 in time series. Meanwhile, when there is the image data converted from the specific word, the image data is also transferred to the work memory 34 together with the character data.

The CPU 20 reads the character data and the image data, which are stored in the work memory 34, in time series to produce a phone call file of HTML format. The phone call file is sent to the driver 22 and is shown on the display panel 15.

The character data and the image data are sequentially shown as the letter and the image on the display panel 15 in time series. In accordance with the color code added to the character data, the letter is shown in a color corresponding to either of the transmission voice and the reception voice. Further, the letter is expressed in the literal type corresponding to the volume level.

Editing of the character data and the image data is done by operating the operating portion 19, viewing the letter and the image shown on the display panel 15. A similar operation is carried out when the character data and the image data are produced and sent as e-mail. The e-mail is created by utilizing an e-mail producing unit 25. The produced e-mail is sent by the CPU 20 to the public network (not shown) via the communication I/F 21 and the antenna 13. When sending and receiving the e-mail, the CPU 20 utilizes an e-mail sending/receiving unit 26. In the meantime, when the character data and the image data produced in HTML format have been received as e-mail, the received letter and image are viewed on the display panel 15 by handling the operating portion 19. In a case that the received character data is produced in HTML format, it is possible to express the character data in the literal type corresponding to the volume level, such as described in the above. Moreover, it is also possible to express the character data in a different color depending on the sort of the voice. When the character data and the image data obtained in this way are saved, the operating portion 19 is handled to save them as permanent data in a memory device 35 comprising an optical disk, a semiconductor memory and so forth.

Figure 3:
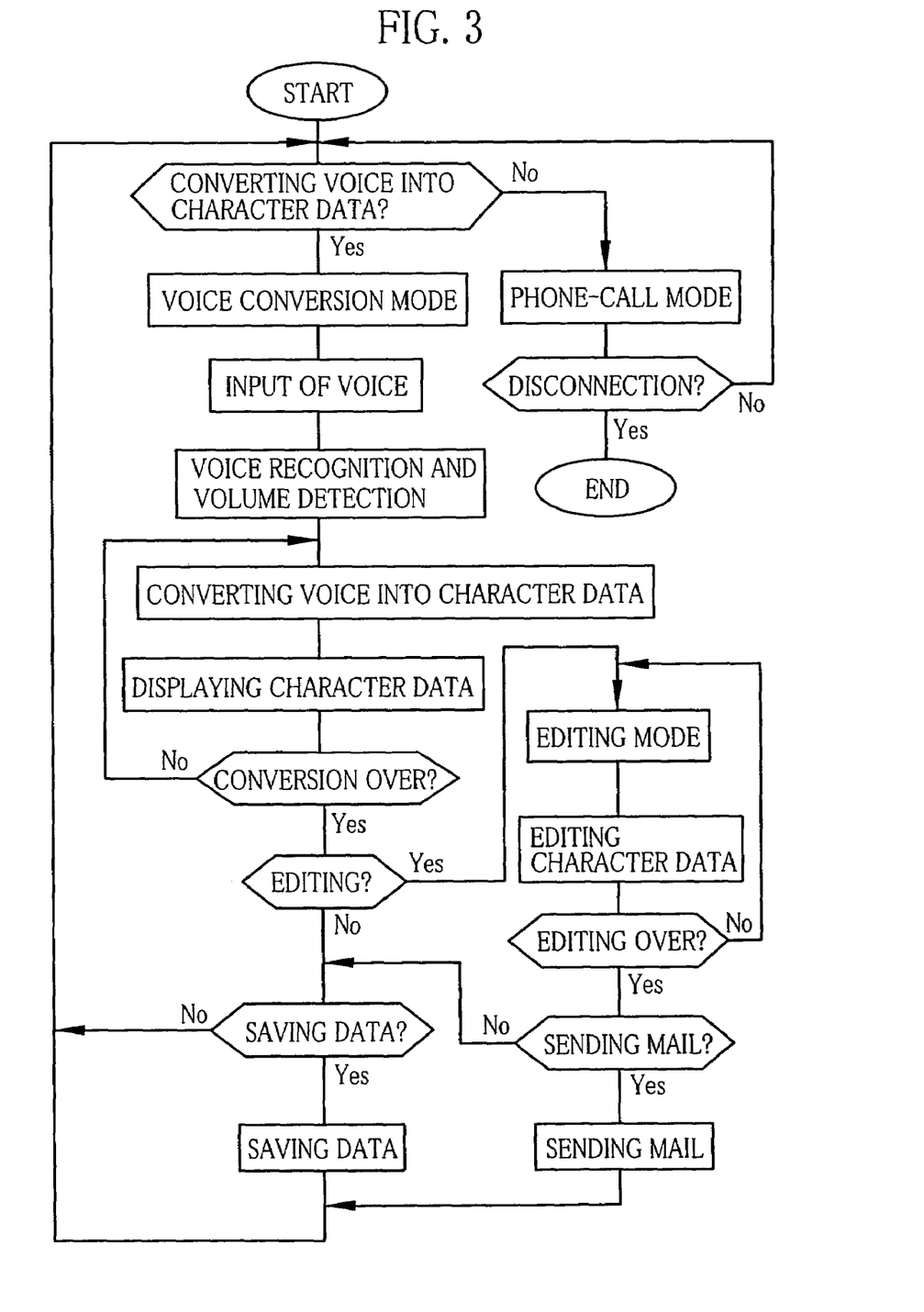
FIG. 3 is a flowchart showing a procedure executed under a voice conversion mode.

Next, an operation of the above embodiment is described below, referring to a flowchart shown in FIG. 3. First of all, the cell phone 2 is connected to the public network to start a phone call. When the reception and transmission voices are converted into the character data and the image data, a voice conversion mode is set by handling the operating portion 19. When the voice conversion mode is not selected, a phone-call mode is set to make a phone call without converting a call voice into the character data and the image data.

Upon making the phone call under the voice conversion mode, the transmission voice information and the reception voice information are sent to the voice-recognition device 30 in which the reception voice and the transmission voice are separately recognized and the feature-quantity data is produced. Moreover, the voice discriminating tag is added to the feature-quantity data in order to make the reception voice and the transmission voice distinguishable. Further, the volume discriminating tag is added on the basis of a search result obtained by the volume detector 30b.

The CPU 20 converts the voice into the prescribed character data and the prescribed image data, referring to the various files stored in the first and second file devices 31 and 32. Successively, the CPU 20 converts the character data into the predetermined literal type, which corresponds to the volume level, on the basis of the voice discriminating tag and the volume discriminating tag. At the same time, the CPU 20 adds the color code to the character data. In virtue of the color code, it is distinguishably shown on the display panel 15 that the character data corresponds to which of the transmission voice and the reception voice. After executing the above processes, the converted character data and the converted image data are stored in the work memory 34 in time series.

Then, the CPU 20 sequentially reads out the character data and the image data, which are stored in the work memory 34, in time series to show the letter and the image on the display panel 15 as the phone call file of HTML format. The letter is shown on the display panel 15 in the literal type corresponding to the volume level. The transmission voice and the reception voice are displayed in different colors.

Upon turning off the voice conversion mode by handling the operating portion 19, the process for converting the call voice into the character data and the image data is over. When the converted character data and the converted image data are not edited and are not saved, the process is returned. And then, if the voice conversion mode is selected again, the above-described process is executed. If this selection is not made, a normal phone call of the voice is carried out. When finishing the phone call, the operating portion 19 is handled to disconnect the network.

When the character data and the image data are edited after turning off the voice conversion mode, a predetermined operation is done with the operating portion 19 to switch to an editing mode. Successively, the user handles the selection key 17, the dial key 18 and so forth of the operating portion 19 to edit the letter and the image, viewing them shown on the display panel 15. The CPU 20 executes an editing process of the letter and the image on the basis of a character-data editing signal and an image-data editing signal, which are sent from the operating portion 19.

When the edited letter and the edited image are sent as e-mail, a predetermined operation is done with the operating portion 19 to switch to a mail-sending mode. After that, the character data and the image data are converted into a style of e-mail and are sent to the public network. Incidentally, the edited character data and the edited image data may be saved in the memory device 35 built in the cell phone 2. Alternatively, the edited data may be saved in an external memory device via the data I/O 23.

In this way, the reception voice and the transmission voice are separately converted into the character data. Further, the different color code is added to the converted character data. The character data to which the color code is added is displayed in time series. Consequently, letter strings respectively corresponding to the transmission voice and the reception voice are displayed in different colors.

Since the display is performed in the literal type corresponding to the volume level, the letter to be emphasized may be distinguished by viewing the literal form. Moreover, since the specific word included in the voice is converted into the preset image data and is shown on the display panel 15, it is possible to produce a memorandum having abundant powers of expression.

In the above embodiment, the transmission voice and the reception voice are displayed by the character data in the different colors, and the literal type is changed to express the difference of the volume level. However, the sort of the inputted voice may be distinguished by changing the literal type, and the volume level may be expressed in the different color. To conclude, any expressing manners may be adopted on condition that the volume-level expressing manner is different from the voice-sort expressing manner.

In the above embodiment, the phone call file is produced in the HTML format. However, XML format may be adopted. Moreover, a switch for changing the HTML format to a text format may be provided, and the phone call file may be produced in the text format.

In the above embodiment, the image corresponding to the specific word is displayed. However, the specific word may be converted into a specific letter string.

Figure 4:
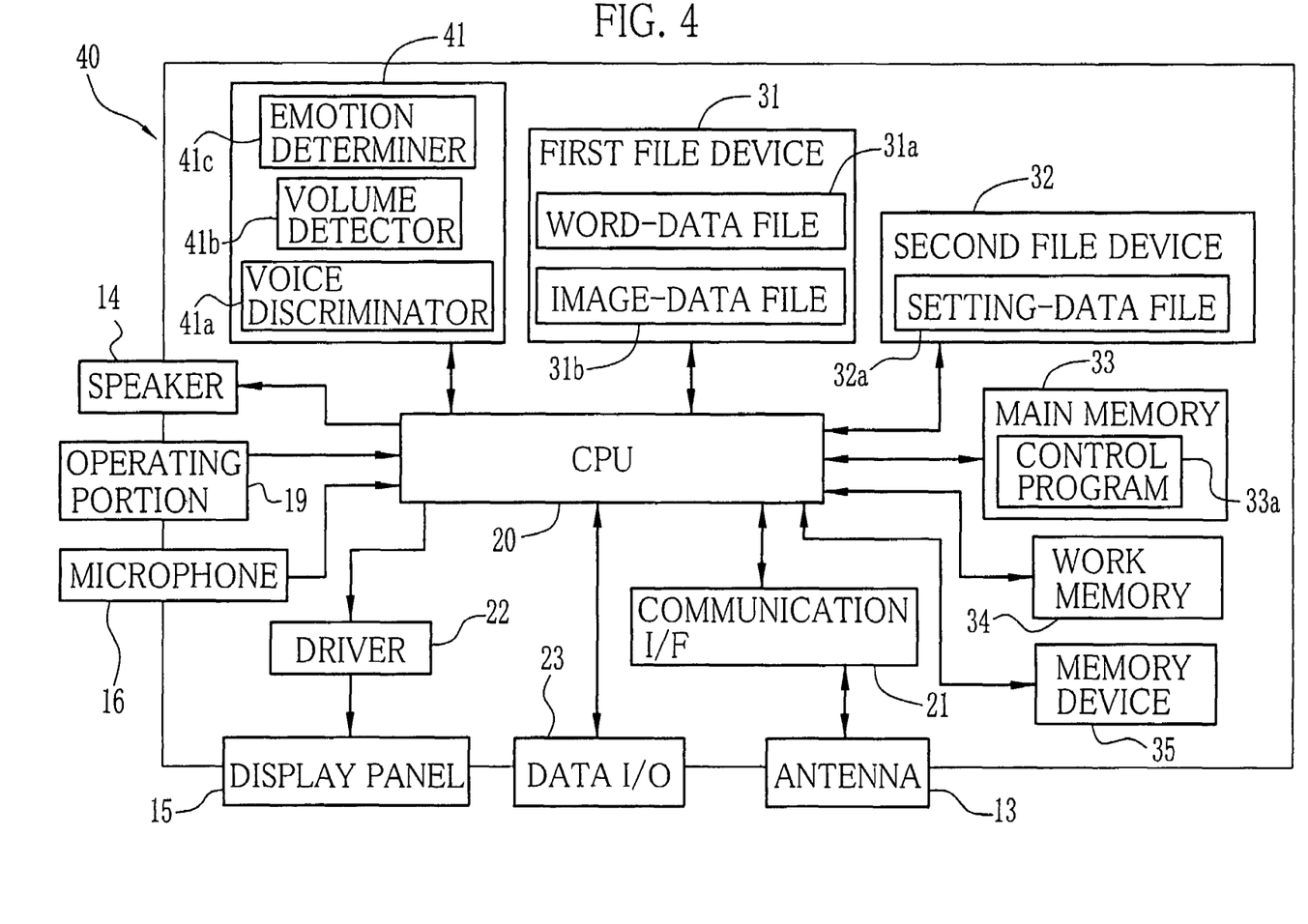
FIG. 4 is a block diagram showing an electrical structure of a cell phone according to a second embodiment.

A second embodiment is described below. FIG. 4 shows an electric block diagram of a cell phone 40 in which a display form of letters is changed in accordance with emotion of a talker. The cell phone 40 comprises a voice-recognition device 41 including a voice discriminator 41a, a volume detector 41b and an emotion determiner 41c. The voice discriminator 41a and the volume detector 41b are respectively identical with that of the first embodiment (see FIG. 2) so that detailed description thereof is abbreviated. Further, the other components except the voice-recognition device 41 are identical with the first embodiment so that the respective components are denoted by the same reference numeral and detailed description thereof is abbreviated.

On the basis of voice data inputted by a transmitter and a receiver, the emotion determiner 41c records a volume, a phone-call speed and an intonation in real time. When the phone call has been over, mean values of the volume and the phone-call speed are calculated. Alternatively, the mean values may be calculated at regular intervals. Successively, a fluctuation amount from the mean value is calculated regarding the recorded voice data to discriminate the emotion of the talker on the basis of the calculated fluctuation amount. For example, when the phone-call volume is extremely higher than the mean value, it is determined that the talker is angry. Incidentally, the mean values of the volume and the phone-call speed may be calculated from voice samples inputted by the transmitter and the receiver prior to the phone call.

In the emotion determiner 41c, the estimated emotion of the talker is recorded as an emotion discriminating tag so as to correspond to the character data. The emotion discriminating tag is classified into categories of laugh, sorrow, anger and surprise, for instance. By the way, the emotion of the talker may be estimated from a laughing voice, a voice of crying and a voice of surprise besides the phone-call speed, the volume and the intonation. Further, the emotion of the talker may be recorded as the emotion discriminating tag by estimating the emotion of the talker from contents of the phone call after conversion to the character data.

In the second file device 32, display-type data concerning the font, the thickness and the color of the letter is recorded for each emotion discriminating tag. The CPU 20 changes the display type of the character data in accordance with the obtained emotion discriminating tag and sends it to the work memory 34.

Besides changing the display type of the letter, a character and an indicia may be added. For instance, the character and the indicia of so-called emoticon or the like may be added to the end of a sentence. When a certain sentence includes the emotion discriminating tag corresponding to "laugh", the character data of "(laugh)" or "(^o^)" is added to the end of the sentence. When a certain sentence includes the emotion discriminating tag corresponding to "sorrow", the character data of "(sorrow)" or "($T_{13}$ T)" is added to the end of the sentence. Further, when the contents of the phone call are sent by e-mail, the indicia may be automatically added to a title of e-mail in accordance with the emotion discriminating tag included in the transmission character data. Furthermore, when incoming mails are listed, it is possible to automatically show the indicia predetermined in accordance with the emotion discriminating tag.

Figure 5:
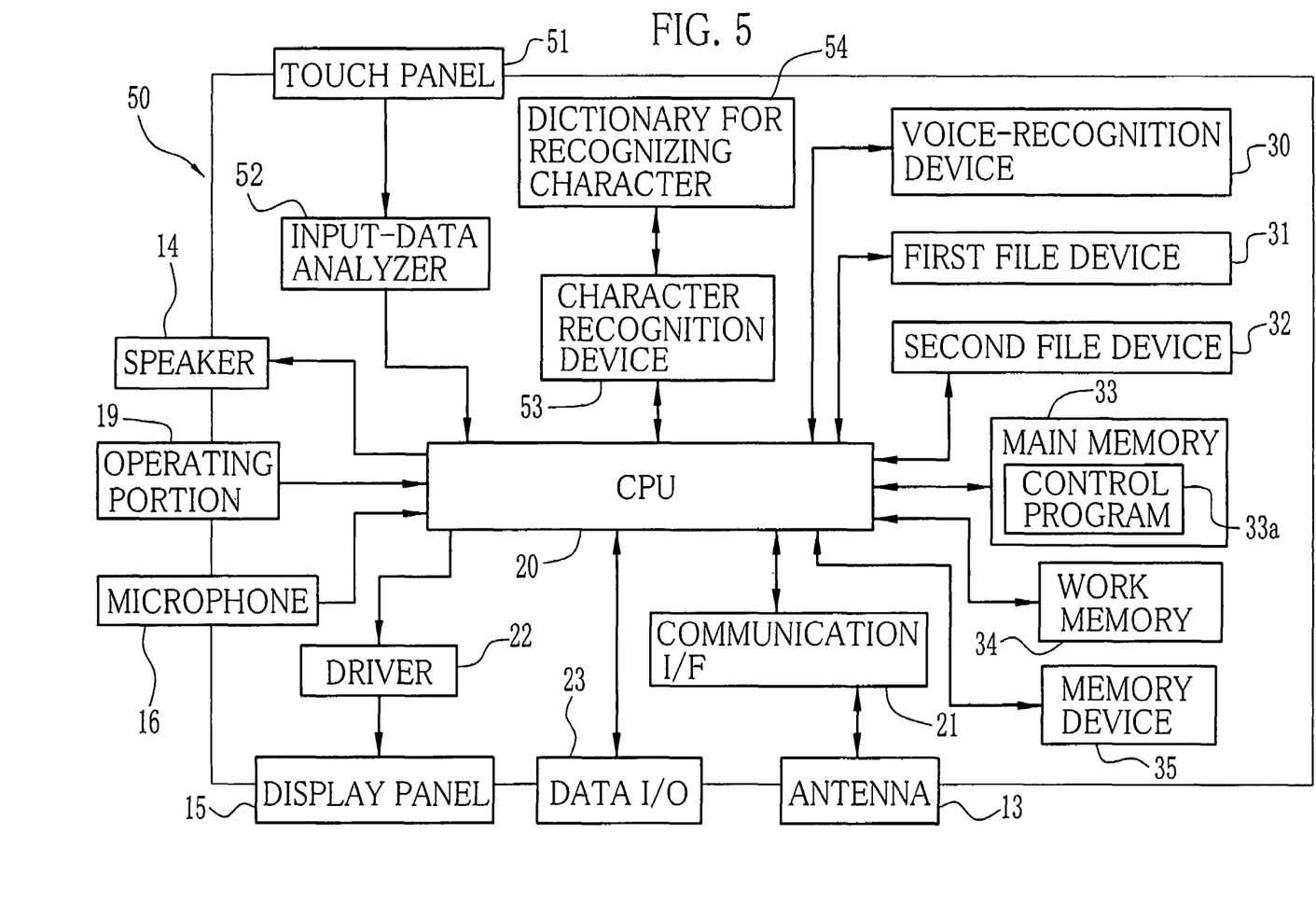
FIG. 5 is a block diagram showing an electrical structure of a cell phone according to a third embodiment.

In the second embodiment, the emotion of the talker is estimated from the phone-call voice. However, the emotion of the user of the cell phone may be estimated from an input manner of a letter inputting device, and the display form of the letter may be changed in accordance therewith. FIG. 5 shows a block diagram of a cell phone 50 according to a third embodiment. The cell phone 50 is identical with that of the first embodiment (see FIG. 2) except for a touch panel 51 for inputting characters, an input-data analyzer 52, a character-recognition device 53, and a dictionary 54 for recognizing the character.

The input-data analyzer 52 detects analog data inputted into the touch panel 51 via a dedicated pen. The detected analog data is transferred to the character-recognition device 53 wherein the inputted analog data is collated with the dictionary 54. And then, the display panel 15 shows nominated letters, which have been judged as being close to the inputted data, to notify the user that which one should be selected.

In the input-data analyzer 52, data concerning an input speed, a pen pressure and a size is recorded whenever the character is inputted via the touch panel 51. When the character has been inputted, mean values of the input speed, the pen pressure and the size are calculated. Alternatively, the mean values may be calculated at regular intervals. The input-data analyzer 52 estimates the emotion of the user at the time of inputting, from a fluctuation amount relative to the mean values of the input speed, the pen pressure and the size. For example, when the input speed is larger than the mean value, it is judged that the user is in a hurry. In contrast, when the input speed is smaller than the mean value, it is judged that the user is calm. Further, when the inputted letter is judged as being neat (namely, a matching rate of the nominated letter is high), it is judged from careful input that an important matter is inputted. In contrast, when the inputted letter is sloppy (namely, the matching rate of the nominated letter is low) and when the pen pressure is extremely high, it is judged that the emotion is high.

Emotional information of the user judged in this way is related to the character data as the emotion discriminating data, on the basis of which the display form of the letter including the font, the thickness and the color is changed. In virtue of this, the inputted letter may be abundantly expressed.

When it is necessary to concurrently carry out the other processes of a voice-recognition process, a phone-call process and so forth in addition to the character input/recognition processes, priority of the character recognition process may be changed in accordance with the emotion discriminating data. In other words, when the input speed is fast, it is judged that the inputted document is important, and the character recognition process is preferentially carried out. When the pen pressure is high, it is judged that the emotion is high. In this case, a stress of the user to be caused due to wait may be relieved by preferentially carrying out the character recognition process. Meanwhile, when the input speed is slow, it is judged that the user inputs with thinking. In such a case, since input of a sentence might be redone, the priority of the character recognition process may be lowered. Further, a message for confirming a procedure of the character recognition process may be displayed for the user. By doing so, the other processes are efficiently carried out.

The above embodiment relates to the cell phone of the handwriting-input type. This embodiment, however, is similarly adopted to another type in that the character is key-inputted via the operating portion 19. It is possible to effectively carry out a plurality of processes by changing priority of conversion processes in accordance with an input speed of keys and a pressure for pressing the key.

The above embodiments relate to the cell phone. The present invention, however, is similarly adopted to portable electronics devices of a PDA (Personal Digital Assistant), a digital camera and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A cell phone in which transmission voice information is inputted via a microphone and reception voice information from the outside is outputted via a speaker, said cell phone comprising:

voice discriminating means for performing voice recognition of said transmission voice information and said reception voice information to convert the recognized voice information into character data representing character information, said voice discriminating means adding a voice discriminating tag to said character data in order to distinguish said transmission voice information and said reception voice information;

volume discriminating means for adding a volume discriminating tag, which represents a volume level of said transmission voice information and said reception voice information, to said character data; and memory means for storing said character data to which said voice discriminating tag and said volume discriminating tag are added, said memory means storing said character data in time series.

2. A cell phone according to claim 1, further comprising:

display-type changing means for changing a display type of said character information in accordance with said volume discriminating tag and said voice discriminating tag; and display means for displaying said character information in the display type changed by said display-type changing means.

3. A cell phone according to claim 2, wherein said display-type changing means changes at least one of a display font, a character size, and a character thickness of said character information in accordance with said volume discriminating tag.

4. A cell phone according to claim 2, wherein said display-type changing means changes a display color of said character information in accordance with said voice discriminating tag.

5. A cell phone according to claim 2, wherein said display means is a liquid-crystal panel.

6. A cell phone according to claim 2, further comprising:

specific-word conversion means for converting said character data of a specific word into image data of an image representing the specific word.

7. A cell phone according to claim 2, further comprising:

emotion judging means for judging an emotional state of a transmitter and a receiver from said transmission voice information and said reception voice information, said emotion judging means adding emotion discriminating information, which corresponds to said emotional state, to said character data, wherein said display-type changing means changes at least one of a display font, a character size, and a character thickness of said character information in accordance with said emotion discriminating information.

8. A cell phone according to claim 7, wherein said emotion judging means calculates a mean value of at least one of a volume and a phone-call speed from said voice information, and said emotion judging means judges said emotional state on the basis of a fluctuation amount relative to said mean value.

9. A cell phone according to claim 8, wherein said mean value is calculated when a phone call has finished.

10. A cell phone according to claim 9, wherein said emotion discriminating means calculates a mean value of at least one of said input speed and said pen pressure, and said emotion judging means judges said emotional state on the basis of a fluctuation amount relative to said mean value.

11. A cell phone according to claim 10, wherein said mean value is calculated when inputting the character has finished.

12. A cell phone according to claim 10, wherein said mean value is calculated at predetermined intervals.

13. A cell phone according to claim 8, wherein said mean value is calculated at predetermined intervals.

14. A cell phone according to claim 2, further comprising:

character inputting means for recognizing a handwritten character inputted via a touch panel, said character inputting means converting said recognized character into said character data; and emotion judging means for judging an emotional state of an input person from one of an input speed and a pen pressure of said character, said emotion judging means adding emotion discriminating information corresponding to said emotional state, to said character data, wherein said display-type changing means changes at least one of a display font, a character size, and a character thickness of said character information in accordance with said emotion discriminating information.

15. A cell phone according to one of claims 7 and 14, wherein said emotion judging means adds emotion representing character information and emotion representing indicia information, which are determined every emotion discriminating information, to said character information.

16. A cell phone according to claim 1, further comprising:

e-mail producing means for producing an e-mail by using said character data; and e-mail sending/receiving means for sending and receiving the e-mail produced by said e-mail producing means.

17. A cell phone according to claim 1, wherein said speaker, said microphone, and said voice discrimination means are disposed in a common housing.

* * * * *